US006964224B2

(12) United States Patent
Minamigawa (10) Patent No.: US 6,964,224 B2
(45) Date of Patent: Nov. 15, 2005

(54) COOKING DOUBLE BOILER

(75) Inventor: Tsutomu Minamigawa, Yokkaichi (JP)

(73) Assignee: Minami Sangyo Co., Ltd., Mei (JP)

( * ) Notice: Subject to any disclaimer, the term of this patent is extended or adjusted under 35 U.S.C. 154(b) by 0 days.

(21) Appl. No.: 10/716,935

(22) Filed: Nov. 20, 2003

(65) Prior Publication Data

US 2005/0109219 A1 May 26, 2005

(51) Int. Cl.[7] .............................................. A23L 1/00
(52) U.S. Cl. ......................................... 99/403; 99/410
(58) Field of Search .................... 99/330, 339, 340, 99/403–418, 444–450, 400, 401, 337, 338; 126/20, 369, 369.1, 390; 219/400, 401; 220/912, 220/428; 210/464–469, 475, 477; 426/523, 426/510, 511

(56) References Cited

U.S. PATENT DOCUMENTS

| 4,574,776 | A | * | 3/1986 | Hidle ........................... 126/369 |
| 5,235,904 | A | * | 8/1993 | Ludena ......................... 99/413 |
| 5,287,798 | A | * | 2/1994 | Takeda ......................... 99/413 |
| 5,584,235 | A | * | 12/1996 | DuBois et al. ................. 99/413 |
| 6,196,115 | B1 | * | 3/2001 | Tsao ............................. 99/339 |
| 6,401,602 | B1 | * | 6/2002 | Lin .............................. 99/339 |
| 6,526,875 | B1 | * | 3/2003 | Dzbinski ....................... 99/339 |

FOREIGN PATENT DOCUMENTS

| JP | 3079181 | 5/2001 |
| JP | 3079120 | 8/2001 |

* cited by examiner

Primary Examiner—Timothy F. Simone
(74) Attorney, Agent, or Firm—Steptoe & Johnson LLP (57) ABSTRACT

A cooking double boiler including an outer pan that is heated upon pouring water therein, an upper lid that covers an upper aperture thereof, and an inner pan with a flange that is set into the interior of the outer pan. The outer pan includes a peripheral edge portion that supports the flange of the inner pan, wherein a plurality of concave portions for directing generated water vapor upward of the inner pan are located at the peripheral edge portion. The cooking double boiler has vapor spouts located between the peripheral edge portion of the outer pan and the flange of the inner pan for movement between open and closed positions.

7 Claims, 13 Drawing Sheets

COOKING DOUBLE BOILER

BACKGROUND OF THE INVENTION

1. Field of the Invention

The present invention relates to a cooking double boiler with which it is possible to easily cook tofu or soymilk skins at home, Japanese style inns, hotels or restaurants.

2. Description of the Prior Art

Tofu or soymilk skins that are made from soymilk are generally produced at factories of tofu makers and are commercially sold at the store of supermarkets and the like. However, accompanying the tofu boom in these years, more and more people make tofu or soymilk skins from soymilk at home. Such homemade tofu or soymilk skins do not contain any preservatives as goods on the marked do, and it is moreover possible to enjoy a freshly made taste. Also when serving tofu for breakfast at Japanese style inns or hotels, it is being preferred to make tofu right before eyes of guests and to serve them in warm conditions.

In this respect, tofu is a food product obtained by curding heated soymilk by a coagulant (magnesium chloride, calcium sulfate or Glucono-delta-lactone etc.) Soymilk skin is a food product, which is a thin film of soy protein that is formed on a surface of soymilk when it is heated without adding bittern thereto, and is eaten by being skimmed therefrom or upon drying the same.

Japanese Utility Patent Registration No. 3,079,181 discloses a pan for manufacturing tofu used for the above purpose. Such a tofu manufacturing pan is comprised of an outer pan, an inner pan with a flange, and a lid that is mounted onto the inner pan. A mixture of a coagulant and soymilk is put into the inner pan, the flange is mounted onto an upper edge of the outer pan, and the top of the inner pan is covered by the lid. When a large amount of water is put into the outer pan and heated, the inner pan is double-boiled, and the soymilk inside thereof is curded to become tofu.

While heating of the soymilk is performed from a bottom surface or sidewalls of the inner pan that are in contact with the hot water within the outer pan in such a tofu manufacturing pan, curding actions are found in soymilk added with a coagulant which results in a gradual increase in viscosity that prevents convection. Accordingly, while heating is performed only through heat transmission through the bottom surface or the sidewalls of the inner pan, a boundary layer of small heat transmission coefficient will be formed at heat transmitting portions so as to remarkably degrade the heat transmission efficiency, and heat will be hardly transmitted to the upper surface or the central portion of the soymilk. The central portion of the soymilk is thus apt to insufficient curding. When the soymilk is heated for a long time for the purpose of curding the upper surface of the central portion thereof, the soymilk that is in contact with the inner pan will be excessively heated so that these curded portions become porous. It was accordingly difficult in a conventional tofu manufacturing pan to uniformly curd the soymilk in the interior thereof.

It is therefore a first object of the present invention to provide a cooking double boiler that enables uniform curding of soymilk and with which everyone can easily make tofu of high quality in a short time.

On the other hand, soymilk skin is a food product that is obtained by heating cold soymilk having a solid content density of 7 to 13% and skimming a curded film that is formed on a surface of this liquid, and similarly to making a tofu, heating operations are also inevitable when forming soymilk skins. However, since the double boiler as disclosed in the above-described Japanese Utility Patent Registration No. 3,079,181 was designed such that the only heat transmitting portion was the bottom portion of the inner pan so that the heat efficiency and the general heat transmission coefficient were small, a drawback was presented in that it took a long time for heating to a temperature suitable for soymilk film formation. Specifically, since it will take 3 to 7 minutes for forming a single soymilk skin and since 4 to 8 sheets are usually skimmed from the same soymilk, it will take as much as approximately 20 to 45 minutes until the last soymilk skin is skimmed off from the point of time the suitable temperature for soymilk skin formation has been reached. Due to the fact that a large amount of fuel is consumed during this time, it was difficult to make soymilk skin by using a small-sized solid fuel, and difficulties were thus found for using such a pan in hotels, restaurants or at home.

Moreover, while it is necessary to supply water since the water within the outer pan was reduced when heating was continued over a long period, it is impossible to supply water without detaching the inner pan in the double boiler as disclosed in the above-described Japanese Utility Patent Registration No. 3,079,181. However, detaching the inner pan containing therein the heated soymilk from the outer pan is dangerous, and the difficulties were found for using such a pan in hotels, restaurants or at home also in this respect.

It is therefore a second object of the present invention to provide a cooking double boiler that does not consume a large amount of fuel and with which everyone can safely make soymilk skim of high quality.

SUMMARY OF THE INVENTION

The cooking double boiler according to a first invention that has been made for the purpose of achieving the above first object comprises an outer pan arranged in that water is poured into its bottom portion, an upper lid that covers an upper aperture thereof, an a inner pan with a flange that is set into the interior of the outer pan, wherein the outer pan includes a peripheral edge portion that supports the flange of the inner pan, wherein a plurality of concave portions for directing generated water vapor upward of the inner pan are formed at the inner side of the peripheral edge portion of the outer pan, and wherein the upper lid is supported by the peripheral edge portion of the outer pan at outer peripheral positions of the concave portions for sealing the water vapor in an upper portion of the inner pan.

The cooking double boiler according to a second invention that has been made for the purpose of achieving the above second object comprises an outer pan arranged in that water is poured into its bottom portion, an upper lid that covers an upper aperture thereof, an a inner pan with a flange that is set into the interior of the outer pan, wherein the outer pan includes a peripheral edge portion that supports the flange of the inner pan, and wherein vapor spouts for directing water vapor generated in the outer pan to an upper space of the inner pan are provided to be openable and closable between the peripheral edge portion and the flange of the inner pan opening and closing of the vapor spout can be performed by changing a set position of the inner pan or by attaching and detaching an attachment.

According to the cooking double boiler of the present invention, a small amount of water is poured into the bottom portion of the outer pan and heated whereupon the generated water vapor not only heats the inner pan from a lower surface thereof but is also directed to above the inner pan through the plurality of concave portions formed at the peripheral edge portion of the outer pan. The upper lid is supported by the peripheral edge portion of the outer pan at the outer peripheral positions of the concave portions for exhibiting the function of sealing water vapor in the upper portion of the inner pan, and accordingly any water vapor will hardly leak to the exterior but will heat the soymilk contained in the inner pan also from its upper surface. Accordingly, soymilk will be evenly heated from both, above and below, and may be evenly curded up to the center in a short time and without becoming porous. Moreover, since condensed water generated, for instance, on a rear surface of the upper lid will repeatedly flow back to the outer pan through the plurality of concave portions, it will not be necessary to replenish water as it was conventionally necessary, and it will become possible to uniformly curd the soymilk with a small amount of fuel and water so that everybody can easily make tofu or soymilk skins of favorable quality.

Since the cooking double boiler according to the second invention is arranged in that the vapor spouts provided between the peripheral edge portion of the outer pan and the flange of the inner pan are openable and closable, these vapor spouts are first opened for directing water vapor generated at the outer pan to the upper space of the inner pan so that the soymilk in the inner pan is heated from two directions, above and below, to thereby perform heating in a short time until the suitable temperature for forming soymilk skins is reached. While the upper lid needs to be opened after heating such that the soymilk skin comes into contact with air, the amount of water vapor generated in the outer pan and wastefully discharged into air when the lid opened is reduced by closing the vapor spouts upon changing a set position of the inner lid or upon mounting an attachment thereon, and it will accordingly not be required anymore to repeatedly supply water as it was conventionally necessary. Even if water is to be supplied, water can be easily supplied by opening the vapor spouts so that it will not be required to detach the inner pan including the heated soymilk therein as it was conventionally necessary and is thus safe.

DESCRIPTION OF THE PREFERRED EMBODIMENTS

Preferred embodiments of the respective inventions will now be explained.

Figure 1:
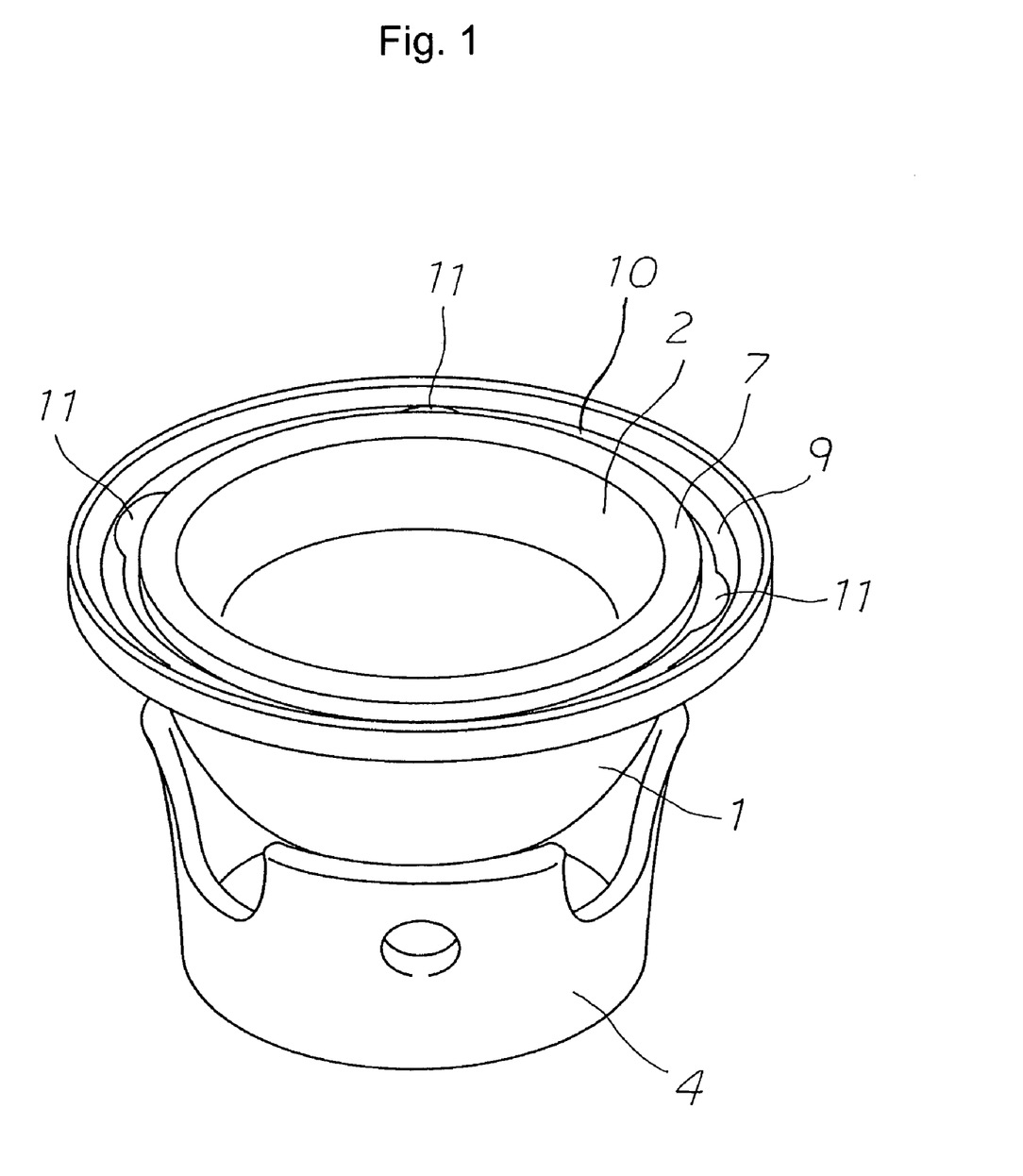
FIG. 1 is a perspective view illustrating a first embodiment according to a first invention.
Figure 2:
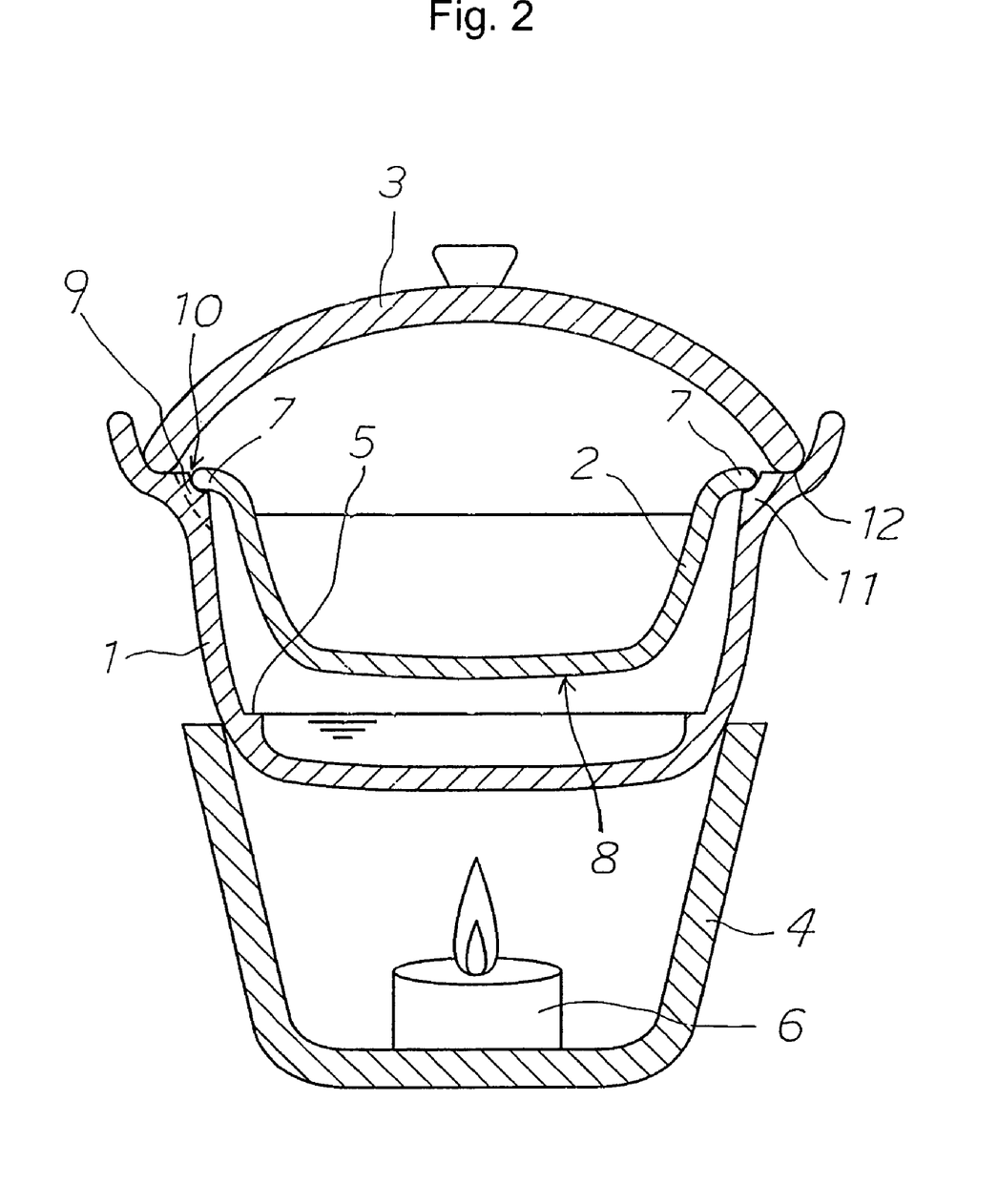
FIG. 2 is a centrally cut, longitudinal sectional view of FIG. 1.
Figure 3:
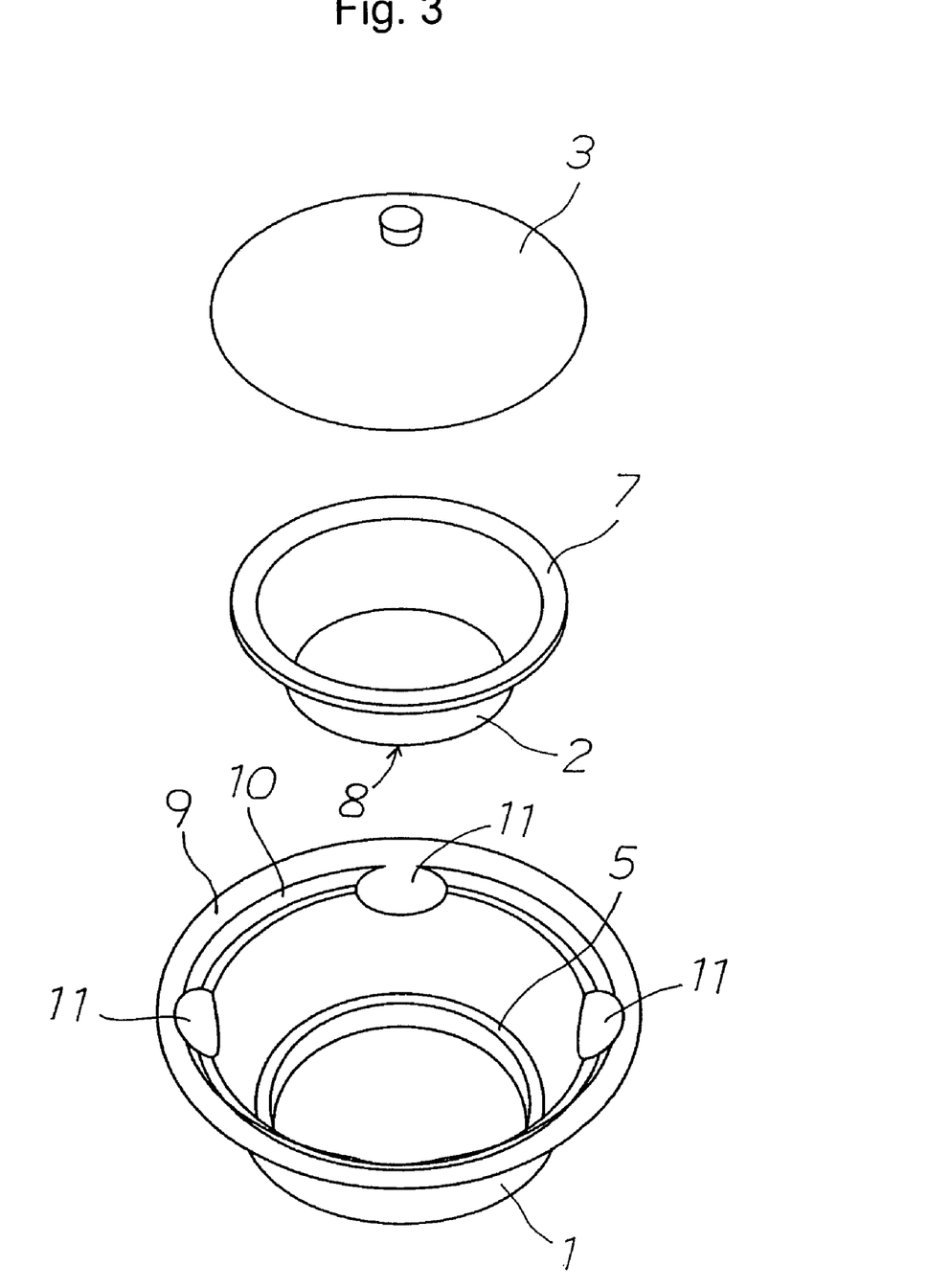
FIG. 3 is an exploded perspective view.

FIGS. 1 to 3 illustrate a first embodiment according to a first invention. As illustrated in FIG. 3, the cooking double boiler according to the present invention is comprised of an outer pan 1, an inner pan 2 and an upper lid 3. While all of the three members in the present embodiment are made of ceramics that exhibit favorable heat resistance, the material is not particularly limited to this and these members may alternatively be formed of metals such as aluminum cast material or stainless steel.

A small amount of water is poured into a bottom portion of the outer pan 1, and the pan is placed onto a cooking stove 4 as illustrated in FIGS. 1 and 2 so as to generate water vapor. It is preferable that a stepped portion 5 is formed on an inner surface of the bottom portion of the outer pan 1 indicative of the amount of poured water. When making tofu for one person, a preferable amount of water of approximately 50 ml will be satisfactory. Accordingly, a small-sized piece of solid fuel or a candle will be suffice as a heat source 6 of the cooking stove 4. However, it goes without saying that it is possible to employ other heat sources such as a gas-type cooking stove.

The inner pan 2 is set into the interior of the outer pan 1 upon putting soymilk therein, and a flange 7 is formed at an upper peripheral edge thereof to run the entire length. According to the present embodiment, the inner pan 2 made of ceramics is glazed except for its bottom surface 8.

The outer pan 1 is provided with an outwardly extending annular peripheral edge portion 9 at its upper portion. As illustrated, an annular and sloped surface 10 is formed at a base portion of the peripheral edge portion 9 for supporting the flange 7 of the inner pan 2. As illustrated in FIG. 2, by fitting the flange 7 into this annular and sloped surface 10, the inner pan 2 is supported at a height at which the bottom surface 8 of the inner pan 2 does not come into contact with water poured into the bottom portion of the outer pan 1.

A plurality of concaved portion 11 is formed at the inner side of the peripheral edge 9 of the outer pan 1. As illustrated in FIGS. 1 and 2, tip ends of these concave portions extend further outside than the flange 7 of the inner pan 2 so that water vapor generated at the bottom portion of the outer pan 1 can be directed to upward of the inner pan 2 through these concave portions 11.

The upper lid 3 is preferably formed to be dome-like so as to avoid condensed water from dropping onto the soymilk, and its lower end portion 12 is supported by the peripheral edge portion 9 of the outer pan 1 at a peripheral position further outside than the concave portions 11 of the outer pan 1 as illustrated in FIG. 2. With this arrangement, water vapor directed through the concave portions 11 to the upper portion of the inner pan 2 will be sealed by the upper lid 3 and thus not wastefully leak to outside.

For making tofu for one person by using the cooking double boiler according to the present invention of the above-described arrangement, water is first poured to the height of the stepped portion 5 formed in the bottom portion of the outer pan 1, and the inner pan 2 is set thereon whereupon soymilk is poured by, for instance, approximately 125 ml. A coagulant such as bittern is then added thereto, and upon putting the upper lid thereon, the double boiler is mounted onto the cooking stove 4 and is heated for approximately 10 minutes. When using a small-sized piece of solid fuel as the heat source 6, one of approximately 10 g shall be used.

The water within the outer pan 1 is heated to become water vapor that heats the inner pan 2 from downside. The soymilk in the inner pan 2 is accordingly heated through heat transmission from below. The generated water vapor enters through the plurality of concave portions 11 formed at the peripheral edge 9 of the outer pan 1 to upward of the inner pan 2 and is sealed in a lower space of the upper lid 3. The soymilk in the inner pan 2 is accordingly heated also from above. Since heating from above is performed for the entire surface of the soymilk, the entire soymilk can be uniformly heated. In this respect, while water vapor is cooled at the rear surface of the upper lid 3 to become condensed water, this water will reach the peripheral edge portion 9 extending outwardly of the outer pan 1 by running along the rear surface of the upper lid 3 and drop into the outer pan 1 through the concave portions 11, and it will not be required to supply water during heating as it was conventionally necessary.

When soymilk is heated in this manner, the soymilk will curd to become tofu. As explained above, since soymilk is evenly heated, it will neither stick to the pan nor become porous and does not require a large amount of water or fuel so that everyone can easily make tofu or soymilk skin of favorable quality in a short time.

Figure 4:
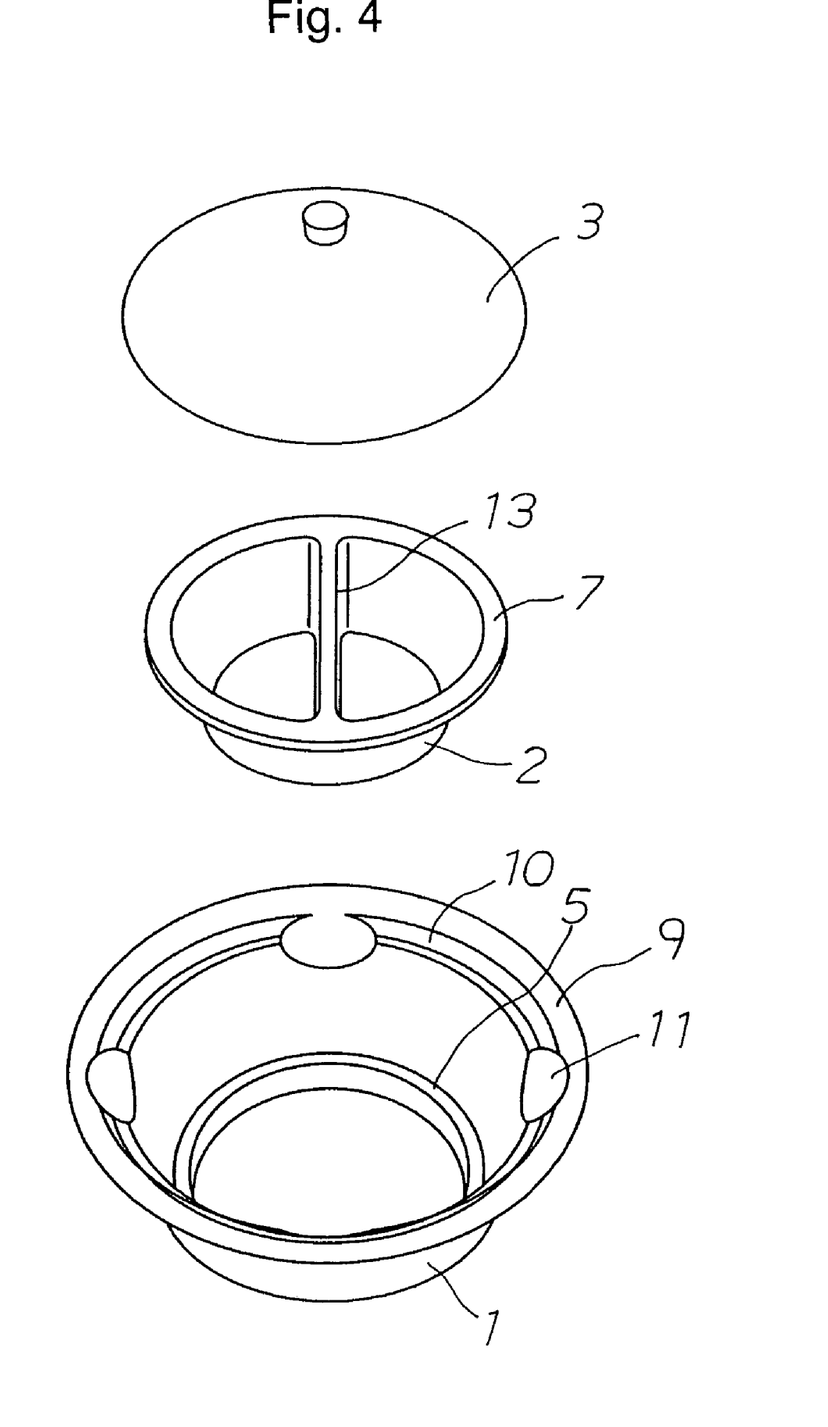
FIG. 4 is a perspective view illustrating a second embodiment according to the first invention.

FIG. 4 illustrates a second embodiment of the first invention, wherein a partition 13 is formed in the center of the inner pan 2. When using such an inner pan 2, it is possible to make red-and white-tofu upon putting some red-colored soymilk into one of the spaces, which is suitable for festive gatherings such as wedding parties. In addition thereto, the shape of the inner pan 2 is not limited to a circular form alone but may also be shaped in a form of a heart.

Figure 5:
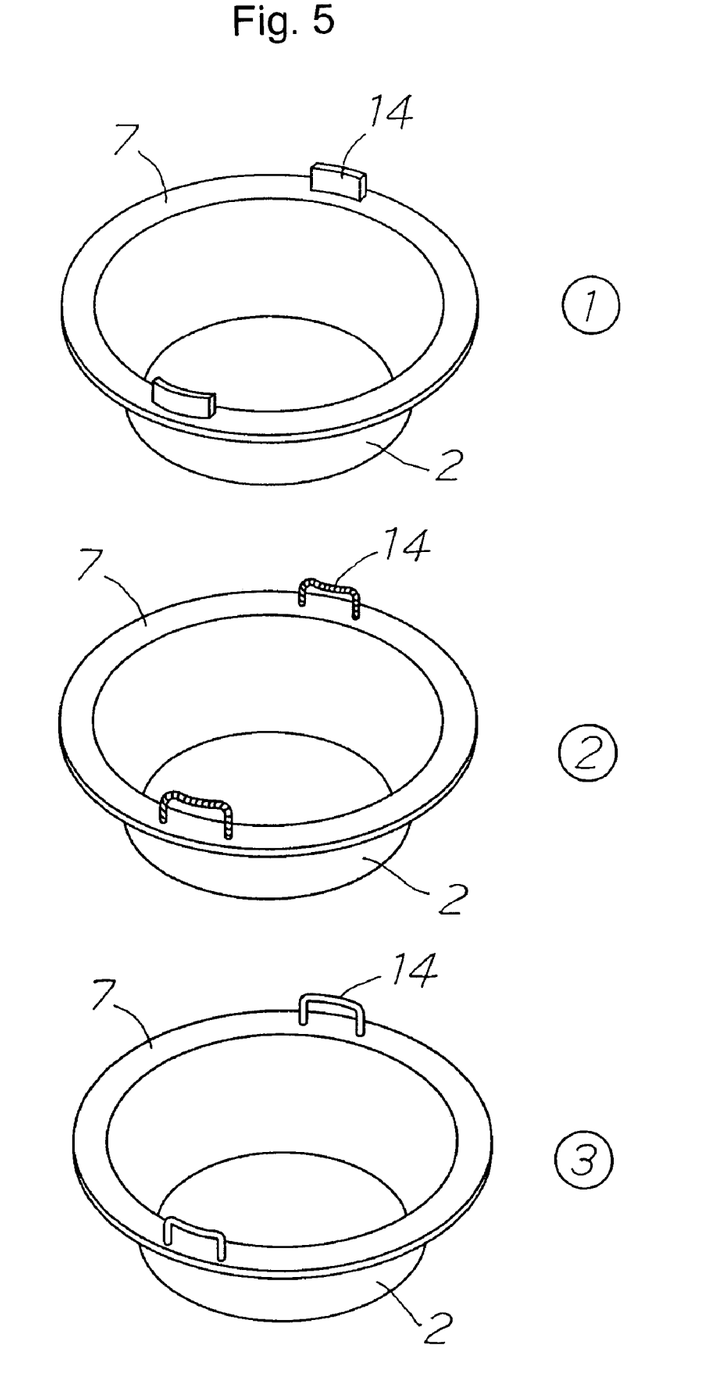
FIG. 5 is a perspective view illustrating an inner pan that is used in a third embodiment of the first invention.

FIG. 5 illustrates a third embodiment of the first invention in which a pair of grips 14 are provided at the flange 7 of the inner pan 2 such that the heated inner pan 2 can be safely taken out. While the grips 14 can be integrally formed with the inner pan 2 as illustrated in ①, it is also possible to provide them as separate members as in ② and ③. When arranging the grips as separate members, it is preferable to select a material of low thermal conductivity such as fibered strings. It goes without saying that the grips 14 shall be arranged so as not to interfere the upper lid 3.

Figure 6:
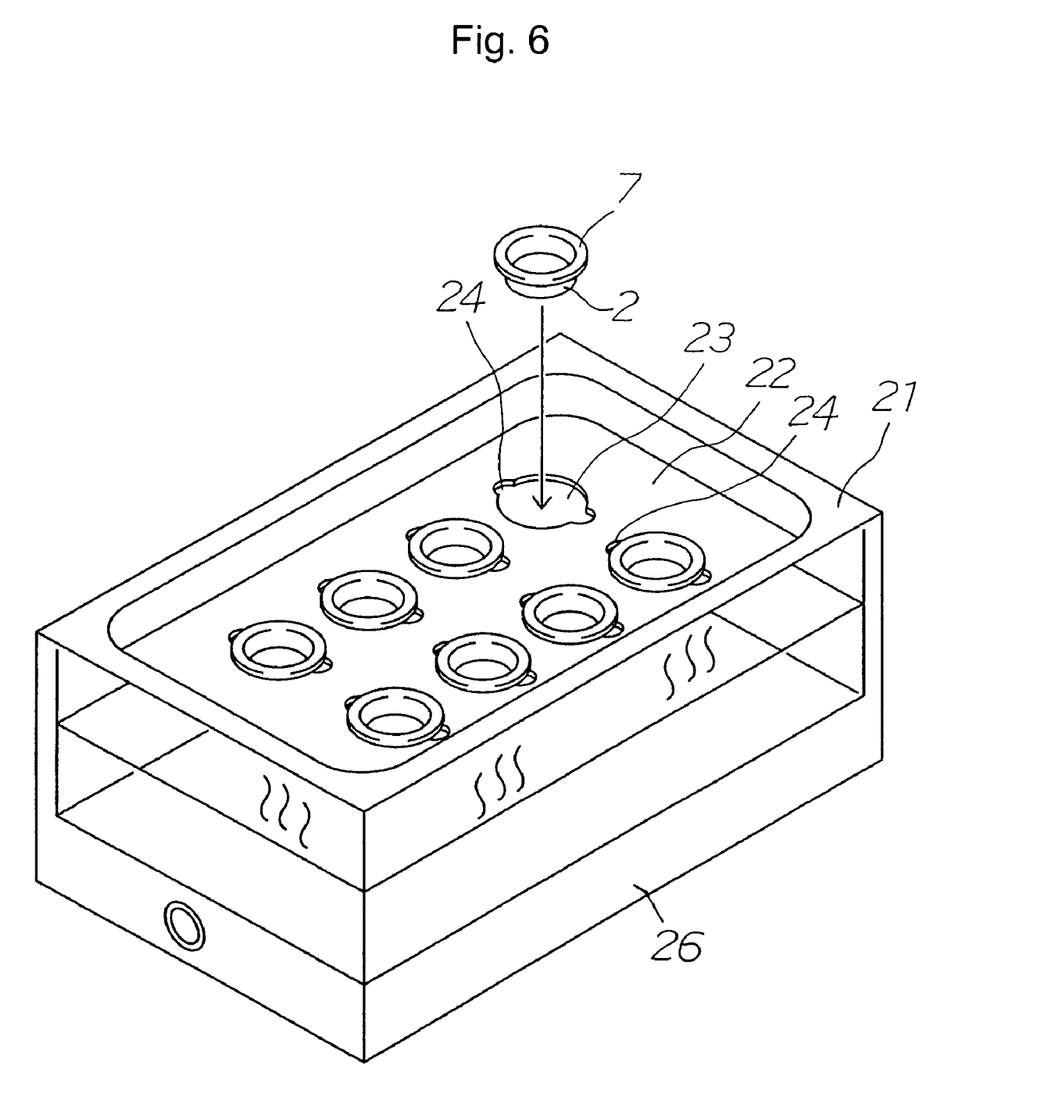
FIG. 6 is a perspective view illustrating a fourth embodiment according to the first invention.
Figure 7:
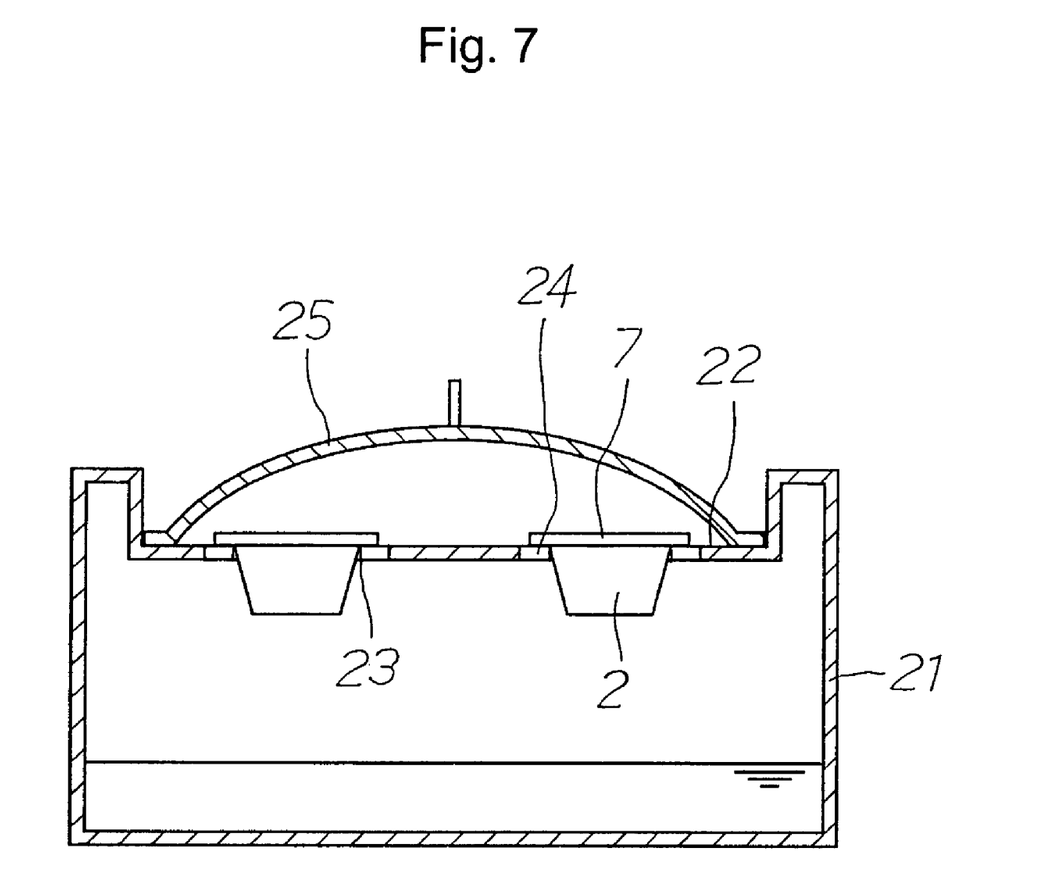
FIG. 7 is a longitudinal sectional view of FIG. 6.

FIGS. 6 and 7 illustrate a fourth embodiment of the first invention, which is suitable when making a large amount of tofu at a time such as in hotels or restaurants. According to this embodiment, outer pan 21 is a storage water heater body made of a metal wherein water is poured in its bottom portion. A peripheral edge portion of the outer pan 21 forms a horizontal supporting surface 22 that extends inward and inner pans 2 with a flange 7 are set into holes 23 formed on the supporting surface 22. A plurality of concave portions 24 introducing water vapor generated in the outer pan 21 to above the inner pan 2 is formed at a plurality of positions around the holes 23. In this respect, while the inner pans 2 are made of ceramics in this embodiment, they may as well be made of metal. A metallic upper lid 25 is supported at the peripheral edge portion of the outer pan 21 at a peripheral position further outside of the concave portions 24 for serving to seal water vapor above the inner pans 2, similar to the above-described embodiments.

Since the arrangement of the present embodiment is such that the outer pan 21 is mounted onto a large-sized heating device 26 as in FIG. 6 so as to permit serving warm tofu to a plurality of guests at the same time, it is suitable for use in serving breakfasts in an all-you-can-eat style.

Figure 8:
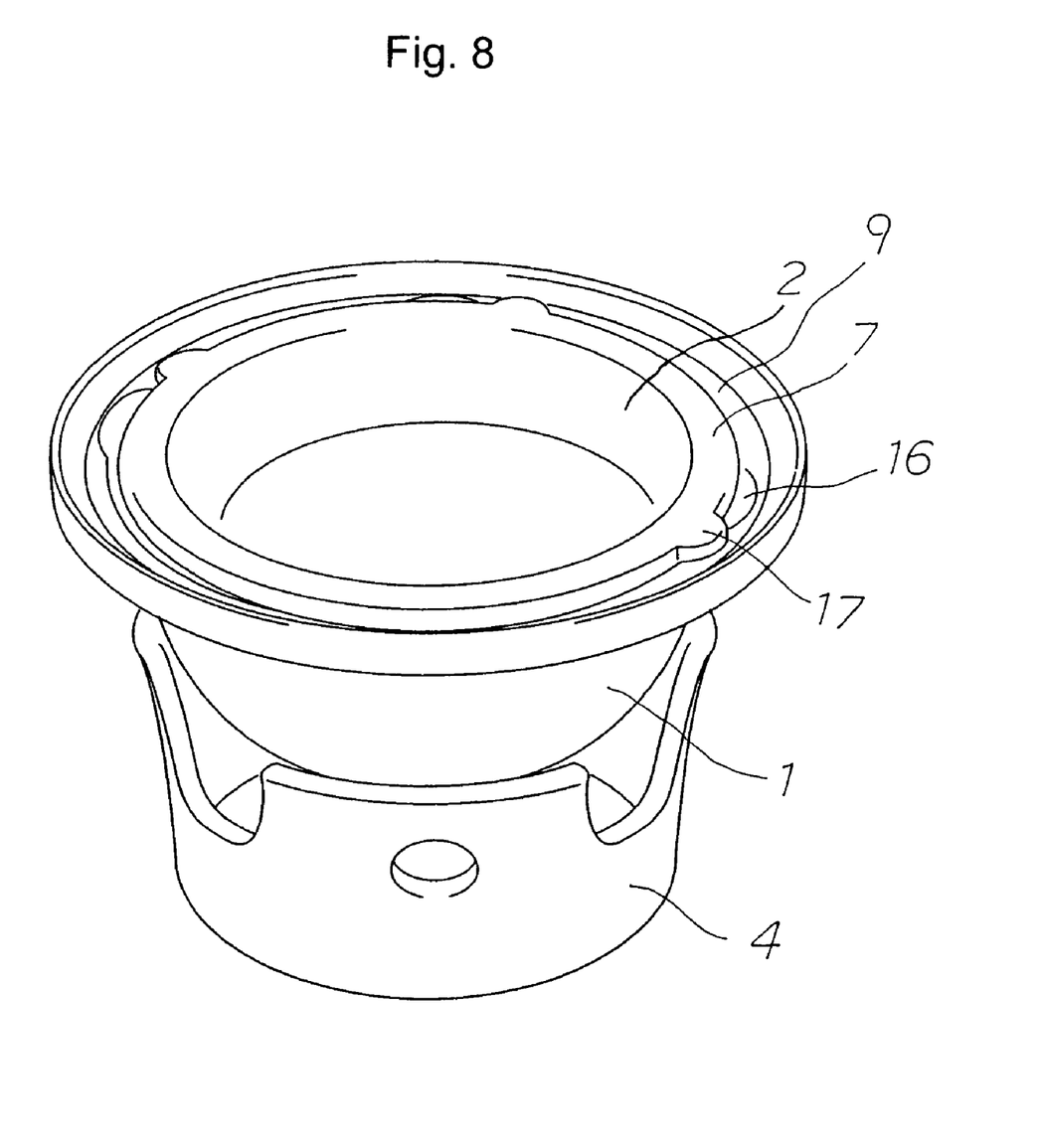
FIG. 8 is a perspective view illustrating a first embodiment according to a second invention.

FIG. 8 and all following drawings are for illustrating embodiments according to a second invention that are particularly suitable for making soymilk skins.

Figure 9:
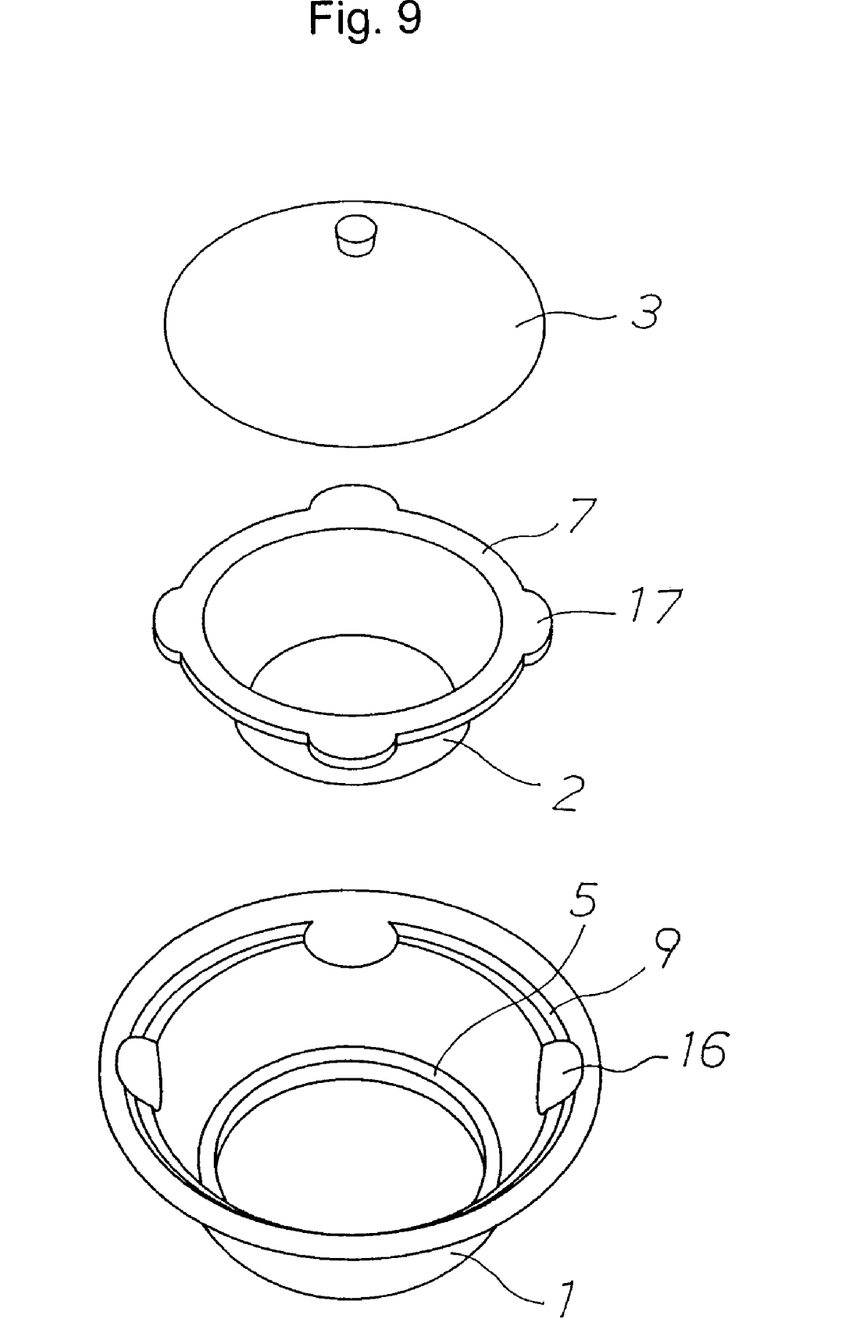
FIG. 9 is an exploded perspective view of the above.

FIGS. 8 and 9 are a view for illustrating a first embodiment of the second invention, and this cooking double boiler is similarly comprised of an outer pan 1, an inner pan 2 that is set in the interior of the outer pan 1, and an upper lid 3 that covers an upper aperture of the outer pan 1. While all of these members are made of ceramics in this embodiment, it is also possible to make them of metals. A small amount of water is poured into a bottom portion of the outer pan 1, the double boiler is mounted onto a cooking stove 4 as in FIG. 8 for heating, and water vapor is generated. Note that the upper lid 3 has been omitted in FIG. 8.

The inner pan 2 is set into the interior of the outer pan 1 upon putting soymilk therein, and is provided with a flange 7 at an outer periphery of its mouth portion. The outer pan 1 is provided with an annular peripheral edge portion 9 for supporting the flange 7, and by engaging the flange 7 with this peripheral edge 9, the inner pan 2 will be supported at a height at which the bottom surface thereof does not come into contact with water poured into the bottom portion of the outer pan 1. The upper lid 3 is supported by the peripheral edge portion 9 at a peripheral position that is further outside than the flange 7 of the inner pan 2 so that a closed upper space is formed upward of the inner pan 2. These arrangements are identical to those of the first invention described above.

However, the second invention is arranged in that vapor spouts 16 for directing water vapor generated in the outer pan 1 to the above-mentioned upper space of the inner pan 2 are provided to be openable and closable between the peripheral edge 9 of the outer pan 1 and the flange 7 of the inner pan 2. In this embodiment, the vapor spouts 16 are a plurality of concave portions formed at the peripheral edge 9 of the outer pan 1, and in the condition as illustrated in FIG. 8, water vapor can be directed to the upper space of the inner pan 2 from between these portions and the outer periphery of the flange 7.

On the other hand, protrusions 17 capable of covering the plurality of vapor spouts 16 are formed on the outer periphery of the flange 7 of the inner pan 2, and by setting the inner pan 2 such that the protrusions 17 meet the vapor spouts 16, the vapor spouts 16 may be closed. This operation can be safely performed also during heating by slightly rotating the inner pan 2.

When making soymilk skin by using this cooking double boiler, the inner pan 2 with the soymilk put therein is first set such that the vapor spouts 16 of the outer pan 1 and the protrusions 17 of the inner pan 2 are shifted from each other as illustrated in FIG. 8. Upon putting the upper lid 3 onto the outer pan 1, the outer pan 1 is placed on the cooking stove 4 for heating. The water in the outer pan 1 is heated so that water vapor is generated whereupon this vapor not only heats a bottom 8 of the pan but is also directed from the vapor spouts 16 to the upper space of the inner pan 2 for heating the liquid surface of the soymilk. In this manner, the soymilk in the inner pan 2 is heated from both, above and below, and is heated at favorable heat efficiency for a short time until a suitable temperature for soymilk skin formation is reached.

After the suitable temperature for soymilk skin formation is reached, the upper lid 3 is detached for making water evaporate from the surface of the soymilk skin and the set position of the inner pan 2 is changed such that the protrusions 17 close the vapor spouts 16 so as to block the vapor spouts 16. As a result, water vapor is prevented from being discharged into air from the vapor spouts 16 and the soymilk in the inner pan 2 is maintained at the soymilk skin forming temperature through heating from below while its surface is made to come into contact with air for forming a soymilk skin. Since wasteful discharge of vapor is restricted when compared to conventional cases, the speed at which water decreases is reduced, and if it should become necessary to supply water, the inner pan 2 only needs to be slightly rotated for enabling safe supply of water through the vapor spouts 16 without the necessity of lifting the inner pan 2.

Figure 10:
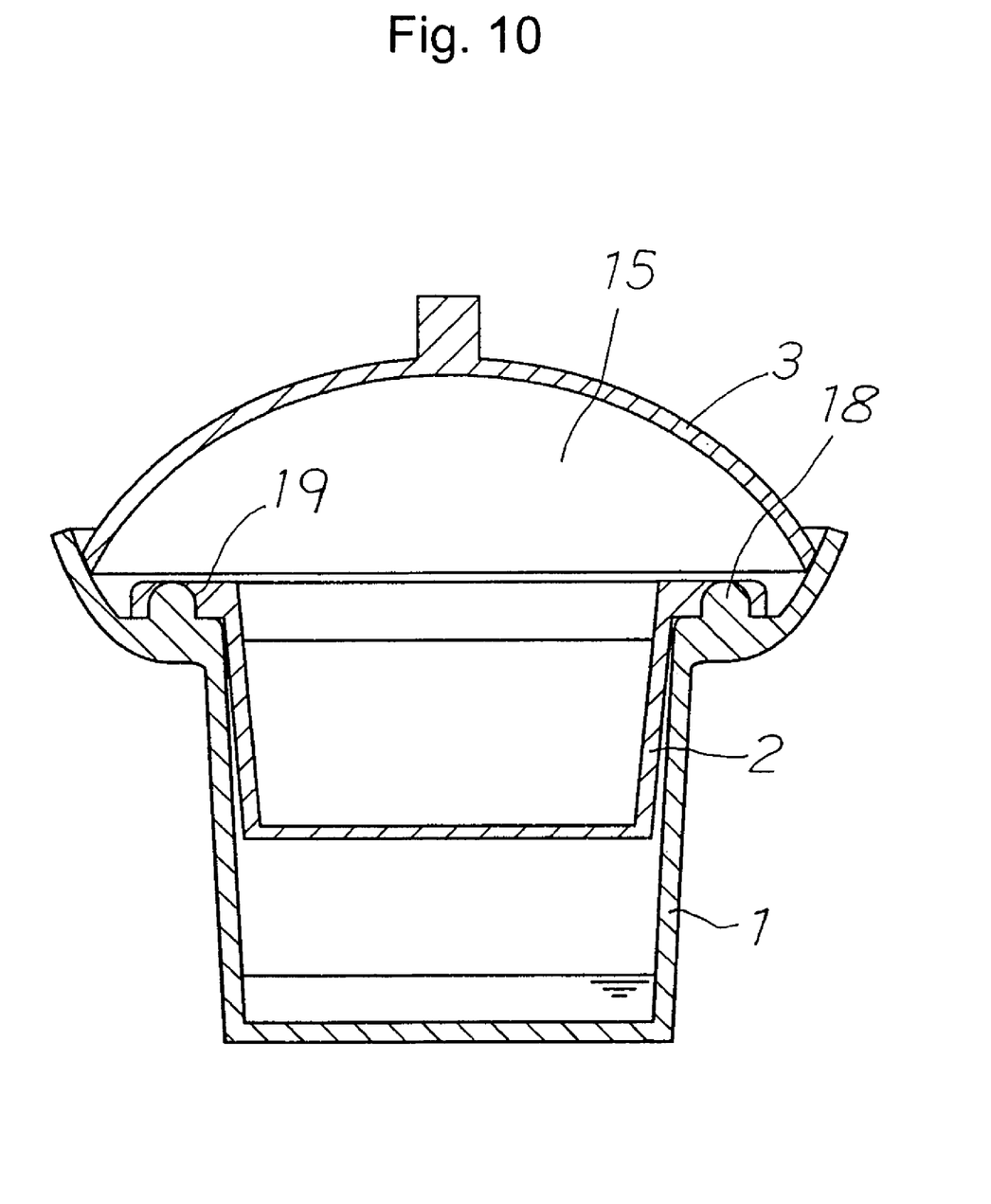
FIG. 10 is a cross-sectional view illustrating a second embodiment of the second invention.
Figure 11:
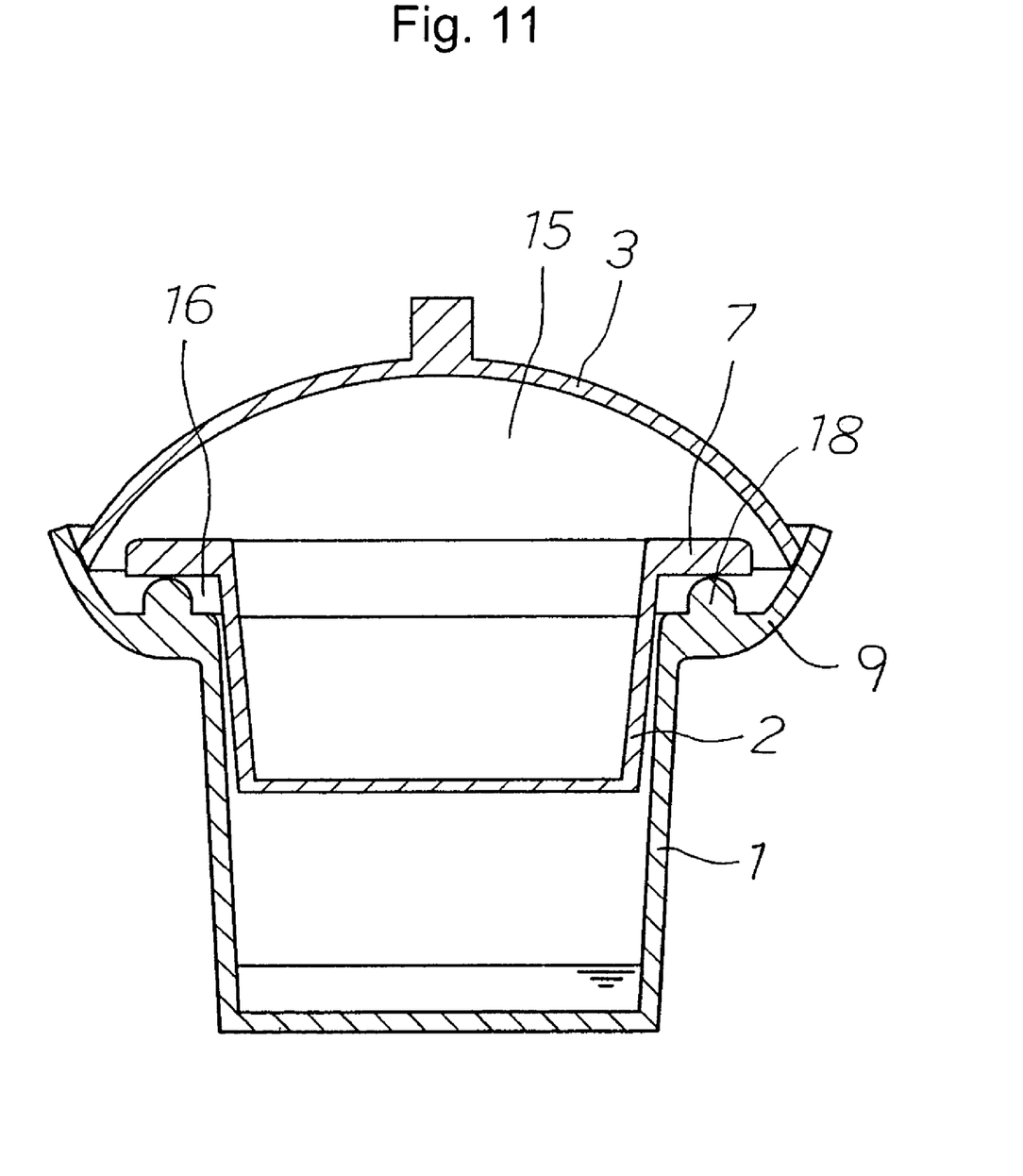
FIG. 11 is a cross-sectional view illustrating the second embodiment of the second invention.

FIGS. 10 and 11 illustrate a second embodiment of the second invention. The cooking double boiler according to the second embodiment is arranged in that a plurality of protrusions 18 is formed on an upper surface of the peripheral edge 9 of the outer pan 1 while holes 19 corresponding to these protrusions 18 are formed on a lower surface of the flange 7 of the inner pan 2. As illustrated in FIG. 11, by setting the inner pan 2 with the holes 19 being shifted from the protrusions 18, vapor spouts 16 are formed between the flange 7 of the inner pan 2 and the peripheral edge portion 9 of the outer pan 1.

Figure 12:
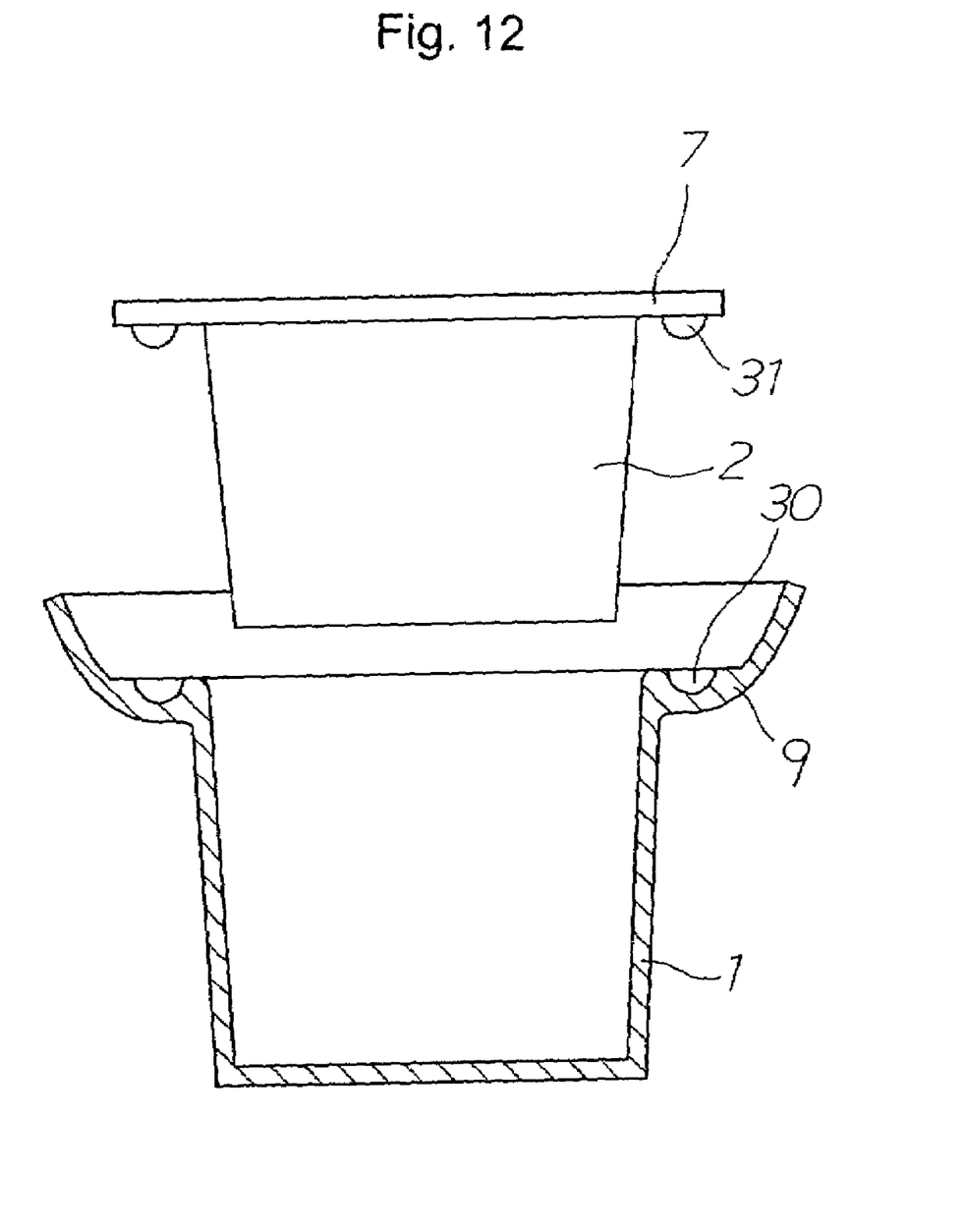
FIG. 12 is a cross-sectional view illustrating a third embodiment of the second invention.

However, when the soymilk has been sufficiently heated, the inner pan 2 is rotated to change its set positions such that the holes 19 of the flange 7 of the inner pan 2 are fitted into the protrusions 18 of the peripheral edge portion 9 of the outer pan 1 as illustrated in FIG. 10 to thereby close the vapor spouts 16 with the flange 7 and the peripheral edge portion 9 being in close contact with each other. In this respect, it is alternatively possible to inverse the concaves and convexes as in a third embodiment as shown in FIG. 12, with concave portions 30 being formed at the peripheral edge portion 9 of the outer pan 1 and protrusions 31 being formed at the flange 7 side of the inner pan 2.

By using the cooking double boiler according to the second and third embodiments, it is similarly possible to heat soymilk from both, above and below, in a short time with the vapor spouts 16 in an opened condition while discharge of water vapor is restricted upon closing the vapor spouts 16 once the soymilk has been sufficiently heated so as to make soymilk skin. Supply of water may also be performed in a remarkably easy manner.

Figure 13:
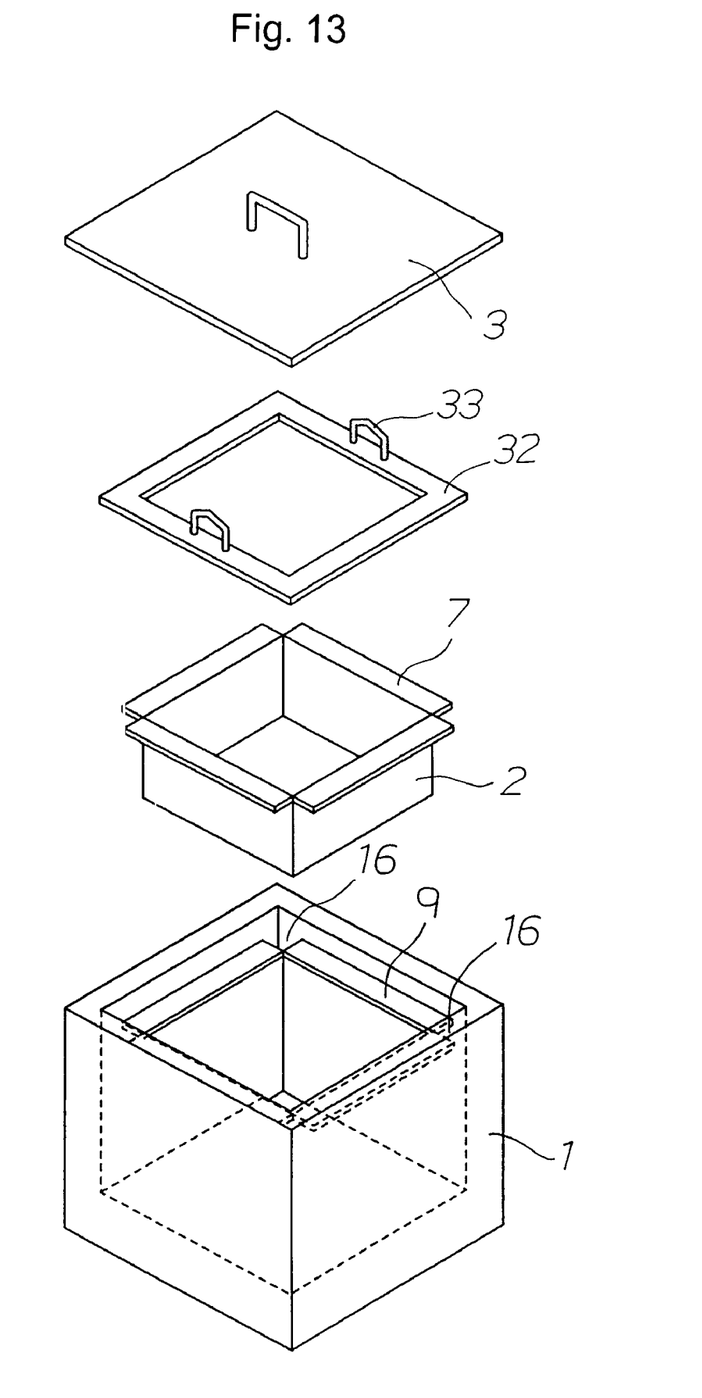
FIG. 13 is a cross-sectional view illustrating a fourth embodiment of the second invention.

The cooking double boiler according to a fourth embodiment as illustrated in FIG. 13 is arranged in that all of the outer pan 1, the inner pan 2 with a flange and the upper lid 3 are made of stainless steel while it is also possible to make them of ceramics. The flange 7 of the inner pan 2 is notched at four corners thereof, and vapor spouts 16 are formed at four corners of the peripheral edge portion 9 of the outer pan 1 that receives this flange 7. Similarly to the above-described embodiment, water vapor can accordingly be directed from these vapor spouts 16 to an upper space of the inner pan 2.

When the soymilk has been sufficiently heated, a square frame-like attachment 32 is mounted onto the flange 7 of the inner pan 2 for closing the vapor spouts 16. When the attachment 32 is provided with handles 33, opening and closing of the vapor spouts 16 can be easily performed. It is possible to make soymilk skin while restricting discharge of vapor also by enabling opening and closing of the vapor spouts 16 by using such an attachment 32. If it should become necessary to supply water, water may be poured through the vapor spouts 16 by using a jug or the like upon detaching the attachment 32 to avoid the necessity of lifting the hot inner pan 2 so that it is safe.

Opening and closing of the vapor spouts 16 by employing the attachment 35 is also applicable to the cooking double boiler of the arrangement as illustrated in FIGS. 8 and 9.

By using the cooking double boiler according to the second invention as explained so far, it is possible to heat soymilk in the interior of the inner pan from two directions, above and below, such that it is heated for a short time until the suitable temperature for soymilk skin formation is reached by first opening the vapor spouts and directing water vapor generated in the outer pan to the upper space of the inner pan. Thereafter, by changing the set position of the inner pan or by mounting an attachment thereafter for closing the vapor spouts, the amount of water vapor generated in the outer pan that is wastefully discharged into air can be reduced and it will not be required to repeatedly supply water as it was conventionally necessary. Even if water is to be supplied, such actions can be safely performed. Moreover, since none of the cooking double boilers according to the respective embodiments will wastefully discharge water vapor, soymilk skin and other food products can be made with a small amount of fuel.

In this respect, the cooking double boiler according to the present invention is suitable not only for cooking tofu or soymilk skin but also for cooking steam-cooked dishes in general, soup or porridge. When cooking soup, it is possible to make clear soup almost free of clouding since the heat exchanging temperature is low, ranging around 100° C., and the cooking double boiler is particularly suitable for cooking seafood soup. It is also possible to put eggs into the inner pan for making pot-steamed hotchpotch. Moreover, when cooking porridge, the cooking double boiler will be advantaged since the porridge will not become a sticky paste since the heat exchange temperature is low. Besides, cheese fondue or chocolate fondue may also be prepared without sticking to the pan.

The cooking double boiler according to the present invention is also favorable for warming over dishes. More particularly, since the cooking double boiler is free of fear of sticking and contents will be hardly cooled, it will not matter even if the heating time becomes somewhat longer. When preliminarily prepared dishes are served by being put into the inner pan and heated, it will be of advantage that nobody in charge of cooking needs to be around.

What is claimed is:

1. A cooking double boiler comprising:
    an outer pan comprising an upper aperture and a bottom portion for holding water;
    an upper lid for covering said upper aperture; and
    an inner pan comprising a flange that is located in the interior of the outer pan, wherein
    the outer pan, the inner pan and the upper lid are made of ceramic material,
    the outer pan comprises a peripheral edge portion that supports the flange of the inner pan;
    the double boiler further comprising vapor spouts for directing water vapor generated in the outer pan to an upper space of the inner pan, said vapor spouts being operable between open and closed positions, and located between the peripheral edge portion and the flange of the inner pan.

2. The cooking double boiler as claimed in claim 1, wherein the inner pan is supported by the peripheral edge portion of the outer pan at a height at which a bottom surface of the inner pan does not come into contact with water when water is poured into the outer pan.

3. The cooking double boiler as claimed in claim 1, wherein the peripheral edge position comprises a plurality of concave portions for providing a backflow path of condensed water.

4. The cooking double boiler as claimed in claim 1, wherein said vapor spouts each comprise a surface of the flange of the inner pan for movement between an open position and a closed position relative to said surface of an inner side of said peripheral edge portion.

5. The cooking double boiler as claimed in claim 1, further comprising an attachment located on said flange for opening and closing the vapor spouts.

6. The cooking double boiler as claimed in claim 1, wherein said bottom portion of the outer pan has a stepped portion indicative of an amount of poured water.

7. The cooking double boiler as claimed in claim 1, wherein the inner pan comprises a plurality of soymilk accumulating portions.

* * * * *